…

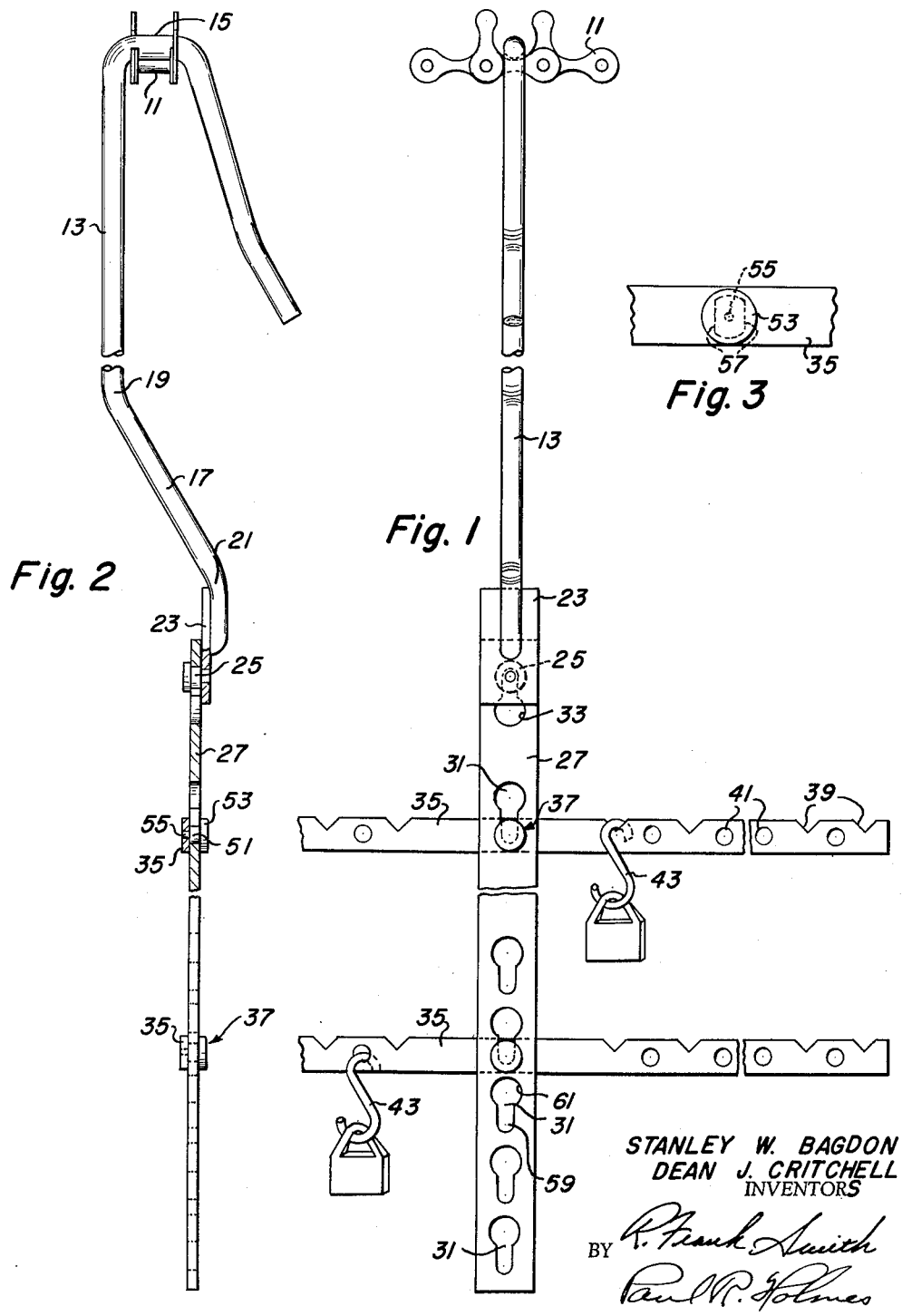

United States Patent Office 3,029,952
Patented Apr. 17, 1962

3,029,952
WORK HANGER
Stanley W. Bagdon and Dean J. Critchell, Rochester, N.Y., assignors to Eastman Kodak Company, Rochester, N.Y., a corporation of New Jersey
Filed Feb. 18, 1960, Ser. No. 9,568
2 Claims. (Cl. 211—117)

This invention relates to a work hanger, and more particularly to a device for suspending work from a conveyor during transport of the work through various cleaning, painting and drying operations.

Many of the known prior art devices are cumbersome and their structure does not admit of easy assembling and disassembling. The work hanger of the present invention overcomes these disadvantages of the known prior art devices. While expressly designed for suspending work during transport through various finishing stations where the type and size of the work may vary considerably, the work hanger of the present invention can be used in many other situations where adjustability and ease of disassembly are useful and desired features.

The primary object of the present invention is therefore to provide a device for suspending work from a support in which the number and position of the work-supporting cross arms may be varied.

Another object of the present invention is to provide a device for suspending work from a support in which each work-supporting cross arm is nonrotatably and releasably mounted in any of a plurality of positions on a hanger.

Still another object of the present invention is to provide a device for suspending work from a support which may be readily assembled to accommodate varying types of work and readily disassembled to facilitate cleaning and reassembly thereof.

Yet another object of the present invention is to provide a device for supporting work from a support which is simple in construction and relatively inexpensive to manufacture.

Still other objects and advantages of the present invention will become readily apparent to those skilled in the art from the following description with reference to the drawing in which like characters denote like parts and wherein:

FIG. 1 is a front elevation view of the work hanger of the present invention;

FIG. 2 is a side elevation view partly in section of the work hanger; and

FIG. 3 is an enlarged view of a cross arm showing the construction of the lug which is utilized for mounting the cross arm on the work hanger.

In FIG. 1 the numeral 11 designates a portion of a link-type conveyor which may be utilized for transporting work through a sequence of stations where the work is subjected to various painting and finishing operations. The work hanger of the present invention comprises a carrier 13 having a reverse bend formed in the upper end 15 thereof for hooking the carrier over the conveyor 11 as shown in FIG. 1. The other end 17 of the carrier is bent slightly at the points designated by the numerals 19 and 21 so that the effective weight of the work carried on the end of the carrier passes through a line which would approximately intersect the point of support of the carrier 13 on the conveyor 11, thereby maintaining the work hanger better oriented with respect to the conveyor. A small plate 23 is welded or otherwise formed on end 17 of carrier 13. This plate carries a lug 25 fixed therein which is utilized for attaching the hanger 27 to the carrier 13.

Hanger 27 is formed with a plurality of keyhole-shaped slots, designated generally by the numeral 31, which are longitudinally spaced throughout the length of the hanger. The keyhole slots 31 are all identical in shape; however, slot 33, which is formed at the upper end of hanger 27, is oriented in a direction opposite to that of all of the remaining slots. The work hanger of the present invention also comprises one or more cross arms 35. These cross arms are mounted on the hanger 27 by means of a lug 37, and are provided with either notches such as those indicated by the numeral 39 and/or with a series of holes such as those indicated by the numeral 41. While it is possible to hang some of the work directly on the cross arms, the present invention contemplates the use of S hooks 43 which may be selectively located on the notches 39 or positioned through the apertures 41 for thereby suspending the work from the cross arms.

Lug 37 is further illustrated in FIG. 3 which is drawn at a slightly enlarged scale from that of FIGS. 1 and 2. Lug 37 comprises a shank 51, a head 53, and an end 55 by means of which the lug is secured to the cross arms 35. The shank of the lug has two substantially parallel flatted sides 57. The distance between flatted sides 57 is slightly less than the distance between the walls defining the narrow end 59 of each keyhole-shaped slot 31. The diameter of the head 53 is just slightly less than the diameter of the larger end 61 of the keyhole-shaped slot 31 so that to nonrotatably and releasably mount a cross arm 35 on hanger 27, it is merely necessary to insert the head 53 of lug 37 through the larger end 61 of slot 31 and move the cross arm down until the flatted sides 57 of the lug are firmly engaged in the narrower end 59 of slot 31. Exactly the same procedure is followed to connect carrier 13 to hanger 27 by means of the lug 25. The lug 25 is for purposes of manufacturing convenience identical in size and shape to lugs 37, and a detailed description of lug 25 will not be set forth herein. Obviously the shape and configuration of lugs 25 and 37 as well as that of slots 33 and 31 could differ substantially without departing from the scope and spirit of the present invention.

It should now be apparent to those skilled in the art that the work hanger of the present invention is relatively simple in construction, is easily assembled and disassembled, and provides a relatively sturdy unit having work-supporting cross arms which may be selectively positioned, nonrotatably and releasably mounted on a hanger member which is in itself releasably and nonrotatably connected to a hook-type carrier member. Many modifications of the present invention are possible and will become readily apparent to those skilled in the art from the foregoing description; and this description is intended, therefore, to be illustrative only, and the scope of the invention is defined in the appended claims.

Having now particularly described our invention, what we desire to secure by Letters Patent of the United States and what we claim is:

1. An easily assembled and disassembled device for suspending work from a support comprising a relatively elongate hanger formed with a plurality of keyhole-shaped slots arranged in longitudinally spaced relation thereon with the narrow portion of each slot positioned below the wide portion thereof; at least one cross member having a single lug only rigidly attached thereto for nonrotatably mounting the cross member substantially transverse to said hanger in any selected one of said slots, said lug including a shank portion having at least two parallel sides for engaging the periphery which defines the narrow portion of said selected slot to thereby prevent rotation of said cross member with respect to said hanger and an enlarged head formed on said shank at a position spaced from said cross member, said head being of a size enabling it to pass through the wide portion of said selected slot so as to position said shank portion in said selected slot and being of a size to prevent withdrawal of said shank portion through said narrow portion thereof whereby the weight of each cross member when mounted on said hanger tends to maintain the shank of its lug in the narrow portion of the selected slot, a carrier for suspending said hanger from said support and means operatively associated with said hanger and carrier for releasably and non-rotatably mounting said hanger on said carrier in depending relation thereto.

2. An easily assembled and disassembled device for suspending work from a support comprising a relatively elongate hanger formed with a plurality of keyhole-shaped slots arranged in longitudinally spaced relation thereon with the narrow portion of each slot positioned below the wide portion thereof, and adjacent to one end of said hanger an additional keyhole-shaped slot formed therein, said additional slot being oriented in a direction opposite that of said plurality of slots and having a configuration substantially identical to each slot of said plurality of slots, at least one cross member having a lug rigidly attached thereto for non-rotatably mounting the cross member substantially transverse to said hanger in any selected one of said plurality of slots, said lug including a shank portion having at least two parallel sides for engaging the periphery which defines the narrow portion of said selected slot to thereby prevent rotation of said cross member with respect to said hanger and an enlarged head formed on said shank at a position spaced from said cross member, said head being of a size enabling it to pass through the wide portion of said selected slot and to prevent withdrawal of said shank portion through said narrow portion thereof whereby the weight of each cross member when mounted on said hanger tends to maintain the shank of its lug in the narrow portion of the selected slot, a carrier for suspending said carrier from said support, and a single lug fixed on said carrier and engageable in said additional slot for mounting said hanger on said carrier, said single lug being substantially identical in configuration to the first-mentioned lug whereby upon engagement of said single lug in said additional slot, the weight of said hanger tends to maintain the shank of said single lug in the narrow portion of said additional slot and said hanger is releasably and non-rotatably mounted in depending relation to said carrier.

References Cited in the file of this patent
UNITED STATES PATENTS

| | | |
|---|---|---|
| 806,192 | Russell | Dec. 5, 1905 |
| 1,132,999 | Beers | Mar. 23, 1915 |
| 1,760,503 | Knape | May 27, 1930 |
| 1,951,196 | Meadows | Mar. 13, 1934 |
| 2,462,431 | Schneider | Feb. 22, 1949 |
| 2,708,088 | Steinke | May 10, 1955 |
| 2,820,757 | Belke | Jan. 21, 1958 |

FOREIGN PATENTS

| | | |
|---|---|---|
| 2,729 | Great Britain | Feb. 5, 1906 |